(12) United States Patent
Santos et al.

(10) Patent No.: US 12,509,949 B2
(45) Date of Patent: Dec. 30, 2025

(54) DEVICE FOR CENTRING AND/OR PULLING A TOOL IN A PIPELINE

(71) Applicant: PETRÓLEO BRASILEIRO S. A.-PETROBRAS, Rio de Janeiro (BR)

(72) Inventors: Hugo Francisco Lisboa Santos, Rio de Janeiro (BR); Ney Robinson Salvi Dos Reis, Rio de Janeiro (BR); Igor Mendes Ursine Krettli, Rio de Janeiro (BR); Hardy Leonardo Da Cunha Pereira Pinto, Rio de Janeiro (BR); Lincoln Homero Thome Ferreira, Rio de Janeiro (BR); Mauricio Galassi, Rio de Janeiro (BR)

(73) Assignee: PETRÓLEO BRASILEIRO S. A.—PETROBRAS, Rio de Janeiro (BR)

( * ) Notice: Subject to any disclaimer, the term of this patent is extended or adjusted under 35 U.S.C. 154(b) by 1061 days.

(21) Appl. No.: 16/754,110

(22) PCT Filed: Oct. 9, 2018

(86) PCT No.: PCT/GB2018/052881
§ 371 (c)(1),
(2) Date: Apr. 6, 2020

(87) PCT Pub. No.: WO2019/077308
PCT Pub. Date: Apr. 25, 2019

(65) Prior Publication Data
US 2020/0332606 A1 Oct. 22, 2020

(30) Foreign Application Priority Data
Oct. 5, 2017 (BR) ...................... 10 2017 021405-2

(51) Int. Cl.
*E21B 17/10* (2006.01)
*B08B 9/051* (2006.01)
(Continued)

(52) U.S. Cl.
CPC .......... *E21B 17/1057* (2013.01); *B08B 9/051* (2013.01); *E21B 23/001* (2020.05);
(Continued)

(58) Field of Classification Search
CPC . B08B 2209/04; B08B 9/051; E21B 17/1057; E21B 23/001; E21B 23/14;
(Continued)

(56) References Cited

U.S. PATENT DOCUMENTS

| 2,736,967 A | 3/1956 | Doll |
| 4,192,380 A * | 3/1980 | Smith ..................... E21B 23/14 166/66.4 |

(Continued)

FOREIGN PATENT DOCUMENTS

| CN | 202647064 U | * | 1/2013 | ............. F16L 55/32 |
| EP | 0177112 B1 | * | 7/1989 | |
| WO | WO-2006115418 A1 | * | 11/2006 | ........... E21B 23/001 |

OTHER PUBLICATIONS

CN202647064U machine translation (Year: 2013).*
International Search Report and Written Opinion corresponding to PCT/GB2018/052881 dated Mar. 1, 2019.

*Primary Examiner* — Douglas Lee
(74) *Attorney, Agent, or Firm* — ARENTFOX SCHIFF LLP

(57) ABSTRACT

The present invention relates to a device for centring and pulling a tool in a pipeline, the device comprising expanding arms, with each expanding arm comprises a wheel suitable for making contact with an inside wall of a pipeline, wherein each wheel comprises at least one magnetic element.

15 Claims, 2 Drawing Sheets

(51) Int. Cl.
*E21B 23/00* (2006.01)
*F16L 55/32* (2006.01)
*F16L 55/44* (2006.01)
*F16L 101/12* (2006.01)
*F16L 101/50* (2006.01)

(52) U.S. Cl.
CPC ............... *F16L 55/32* (2013.01); *F16L 55/44* (2013.01); *B08B 2209/04* (2013.01); *F16L 2101/12* (2013.01); *F16L 2101/50* (2013.01)

(58) Field of Classification Search
CPC ..... E21B 4/18; F16L 2101/12; F16L 2101/50; F16L 55/32; F16L 55/44
See application file for complete search history.

(56) References Cited

U.S. PATENT DOCUMENTS

| | | | |
|---|---|---|---|
| 4,928,758 | A | 5/1990 | Siegfried, II |
| 5,736,821 | A | 4/1998 | Suyama |
| 7,839,969 | B2 * | 11/2010 | Gallup ................ G01N 23/223 378/45 |
| 9,181,796 | B2 | 11/2015 | Malone et al. |
| 2005/0145415 | A1 * | 7/2005 | Doering ................ E21B 4/18 175/24 |
| 2009/0236101 | A1 * | 9/2009 | Nelson ................ E21B 17/1021 166/216 |
| 2013/0068479 | A1 | 3/2013 | Aldossary |

* cited by examiner

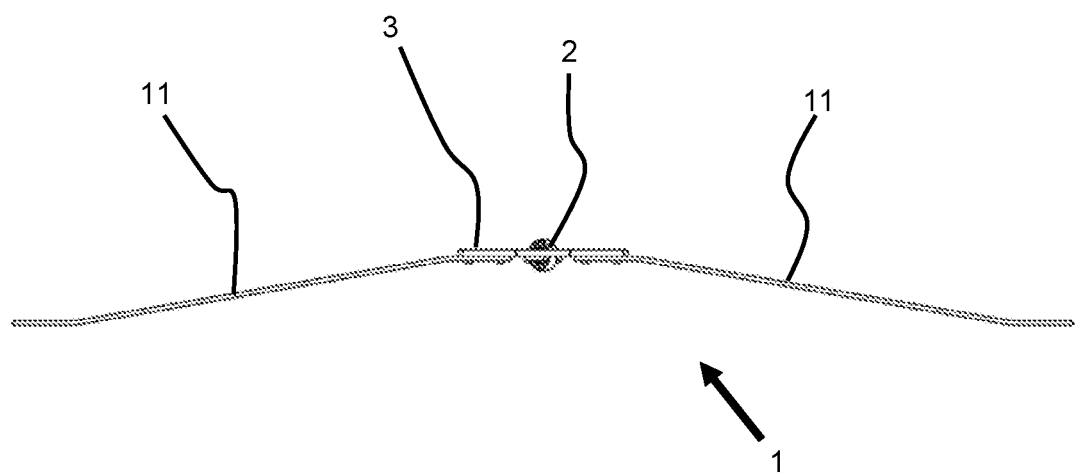
FIG. 2
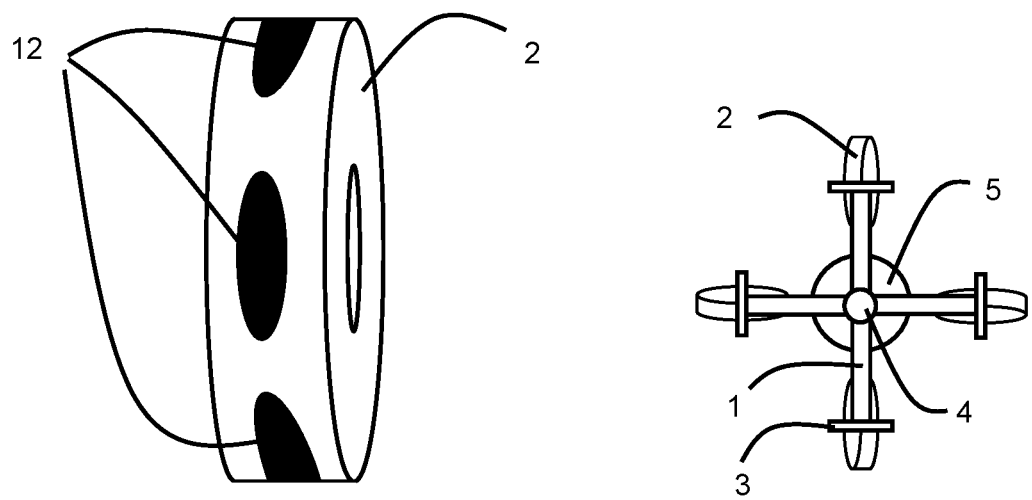
FIG. 3
FIG. 4

DEVICE FOR CENTRING AND/OR PULLING A TOOL IN A PIPELINE

CROSS-REFERENCE TO RELATED APPLICATION

This application is a U.S. National Stage entry under 35 U.S.C. § 371 based on International Application PCT/GB2018/052881, filed on Oct. 9, 2018, which claims the benefit of priority to BR 10 2017 021405-2, filed 5 Oct. 2017. The embodiment of the priority application are hereby incorporated herein in their entirety by reference.

FIELD OF THE INVENTION

The present invention relates to devices for centring and/or pulling tools inside pipelines; especially for, but not limited to, using autonomous tools inside production strings of oil wells. More specifically, the present invention relates to devices for centring and/or pulling tools inside pipelines wherein use is made of expanding arms with wheels with magnetic elements. The wheels with magnetic elements constitute means for removing the oil film that might otherwise be present at the contact with the inside wall of the pipeline.

BACKGROUND OF THE INVENTION

It is well known in the prior art that petroleum and natural gas are extracted from porous rocks located at hundreds to thousands of metres below ground level. Production units called wells are constructed for draining them. Construction is carried out using special vessels for this purpose, called rigs.

These vessels drill the wells, and then put in place steel pipes, called casing, between the drilled formation and the interior of the well, in order to guarantee integrity of the system. Finally, various items of equipment are installed inside the well, such as safety valves, control valves, pumping systems, etc. The purpose of these devices is to ensure controlled, safe production in the well.

However, these wells do not provide uninterrupted production throughout their useful life. It may be necessary to carry out maintenance operations. This type of operation is called workover. Some common reasons for performing these operations are failure of equipment, holes in the production string, restrictions due to incrustation, a high level of production of water or gas, production of sand, etc.

In the prior art, these operations for maintenance of wells are carried out using specialized vessels called rigs.

Execution of these maintenance operations is preceded by planning of the intervention. After this step, the rigs are moved to the well and positioned above it, either using anchors, or with dynamic positioning systems, then the rig removes the cap from the Christmas tree, also known as tree cap.

Next, a set of pipes, known as risers, is lowered and connected to the tool of the Christmas tree, allowing further tools to be lowered inside the well through the risers. Such tools include slickline tools; wireline tools, and coiled tubing tools. These tools perform the maintenance operations in the well.

The main problem with this approach is the cost, since the rigs command quite high daily rates, especially in the offshore environment. Furthermore, for carrying out these interventions it is necessary to wait until the rig is available, which may take months, so that from failure until repair, such wells are shut down or have reduced production, causing loss of production, which may be high in high-productivity wells.

To expedite the well intervention processes, autonomous robots may be used, which are introduced into the wells for carrying out the necessary maintenance operations. For the robot to move efficiently through the pipeline and perform the operations for which it is intended, it is important that it is properly centralized inside the well and that it possesses capacity for movement compatible with its purpose.

Usually the centring of well tools is ensured by using metal strips that move in contact with the casing. For robots or other tools with their own movement, it is possible to use arms with wheels at their ends, wherein these arms are supported by the wheels on the walls of the pipeline, ensuring that the body of the robot does not come into contact with the pipeline wall and also ensuring that these wheels have capacity for movement compatible with their purpose.

It is therefore important that these wheels are in direct contact with the inside wall of the pipeline. Furthermore, the arms must also aid guidance of the robots inside the pipeline, preventing the tool becoming trapped and guaranteeing a sufficient normal force. Finally, these centralizers will work in various ranges of diameter. Thus, it is important that with any level of contraction, they guarantee contact of the wheels with the wall.

Owing to the presence of oil inside the pipeline, an oil film forms between the wheels and the inside wall of the pipeline, so that the wheels are not in direct contact with the wall of the pipeline, leading to undesirable slipping.

In the prior art there is a plurality of documents that disclose a variety of solutions to the problem of centring and pulling tools inside pipelines. However, these documents do not address the aforementioned problems, i.e. they do not propose to ensure that the wheels are directly in contact with the pipeline wall, with sufficient force and in a varied range of diameters. Some examples of these documents are listed hereunder.

Document U.S. Pat. No. 9,181,796B2 discloses a method for monitoring the position of a tool in a well that involves determining the position of the tool by comparing the distance it has travelled in the well against a stationary reference point.

The method involves rolling a wheel along the inside wall of the well as the tool is moved inside the well. Thus, the distance travelled by the tool is calculated from the number of revolutions of the wheel.

However, although document U.S. Pat. No. 9,181,796B2 discloses a tool used inside oil wells that comprises an articulated arm for centralizing the tool, this document does not make any reference to removing the oil film between the wheels of the articulated arm and the inside wall of the pipeline, which would increase the coefficient of friction between the wheel and the wall.

Document U.S. Pat. No. 4,928,758A discloses a bottom-hole tool for measuring flow, comprising expanding means for forming rings between the tool and the inside wall of the pipeline to form a restricted-passage flow and a flow sensor. In addition, the expanding means aids centring the tool inside the well. According to this document, the expanding means comprise vane wheels that act as flow sensors.

Thus, although U.S. Pat. No. 4,928,758A discloses a device for centring a tool in a well, the purpose of this device is to aid measurement of the flow in the pipeline. Nothing is mentioned in this document in relation to removal of the oil film between the wheels of the articulated arm and the pipeline wall, which would increase the coefficient of friction between the wheel and the wall.

Document U.S. Pat. No. 2,736,967A relates to apparatus for measuring variations in the transverse dimensions of a wellbore. The apparatus described in that document comprises bowed spring arms that comprise wheels for aiding centralizing of the tool in the well.

When in operation, as the tool moves inside the well, the spring arms press the wheel against the wall. Thus, due to the imperfections of the borehole wall, the wheel moves away and approaches the central body of the tool, allowing the imperfections to be measured.

Thus, although U.S. Pat. No. 2,736,967A discloses a spring arm connected to a tool for use in a well, nothing is mentioned in this document in relation to removing the oil film between the wheels of the articulated arm and the pipeline wall, which would increase the coefficient of friction between the wheel and the wall.

As will be presented in more detail hereunder, the present invention aims to at least partially solve the problems of the prior art described above in a practical and efficient manner.

SUMMARY OF THE INVENTION

The present disclosure provides a system for centring and pulling tools inside a pipeline that aims to guarantee a high enough capacity for movement for the tool to perform its function.

In order to achieve the aims described above, a first aspect of the invention provides a device for centring and pulling a tool in a pipeline, the device comprising one or more of the following features: expanding arms, with each expanding arm comprising a wheel suitable for making contact with an inside wall of a pipeline, wherein each wheel comprises at least one magnetic element. The magnetic element can urge the wheels towards the inner surface of the pipeline, providing better traction. The at least one magnetic element of each wheel can be suitable for removing the oil film at the contact of the wheel with the inside wall of the pipeline.

Optionally, the device comprises at least one set of said expanding arms.

Optionally, the device comprises four sets of said expanding arms.

Optionally, two sets of said expanding arms are positioned ahead of the tool and two sets of said expanding arms are positioned after the tool.

Optionally, each set of expanding arms comprises four expanding arms.

Optionally, each expanding arm comprises an elastic element. The elastic element can be of the spring type. Each expanding arm can comprise two elastic elements. These features help the device adjust to the internal size of the pipeline.

Optionally, the two elastic elements can be joined at a central point of the arm. The wheel can be positioned at the central point. Each expanding arm can further comprise a support for the wheel. The two elastic elements of each expanding arm can be fixed to the support of the respective expanding arm. Each elastic element can comprises a spring element with a double kink and straight middle. These features can contribute to a convenient way of positioning the wheels to be urged against the inner surface of the pipe.

Optionally, the wheels can be positioned inclined relative to a movement axis of the tool. The wheels can be configured to cause bi-helicoidal movement of the tool inside a pipeline.

Optionally, the device further comprises a motor generating rotational movement of the wheels.

According to another aspect of the invention, there is provided a method of moving a tool within a pipeline, wherein the method comprises: providing a device comprising a tool within a pipeline, wherein the device is provided with wheels; and moving the device through said pipeline on said wheels; wherein each wheel comprises one or more magnetic elements.

Optionally, the device is the device of the first aspect.

Also disclosed is a magnetic device capable of removing the oil film between the wheels of the articulated arm and the pipeline wall, which increases the coefficient of friction between the wheel and the wall. It further provides expanding arms for centring and pressing the wheels against the wall, wherein each expanding arm comprises at least one sliding wheel suitable for making contact with the inside wall of the pipeline, so that each sliding wheel comprises at least one magnetic element suitable for removing the oil film at the contact between the wheel and the inside wall of the pipeline.

There is also disclosed a device for centring and pulling a tool (5) in a pipeline comprising expanding arms (1), with each expanding arm comprising at least one sliding wheel (2) suitable for making contact with the inside wall of the pipeline, said device being characterized in that each sliding wheel (2) comprises at least one magnetic element suitable for removing the oil film at the contact of the sliding wheel (2) with the inside wall of the pipeline.

Optionally, the device comprises at least one set (10) of expanding arms (1), wherein each set (10) of expanding arms (1) comprises four expanding arms (1).

Optionally, the device comprises four sets (10) of expanding arms (1) each with four expanding arms (1), wherein two sets (10) of expanding arms (1) are positioned ahead of the tool (5) and two sets (10) of expanding arms (1) are positioned after the tool (5).

Optionally, the expanding arm (1) is an elastic element of the spring type.

Optionally, the expanding arm comprises two elastic elements (11) joined at a central point, with the sliding wheel (2) positioned at the central point.

Optionally, the device comprises a support (3) for the sliding wheel (2), with the elastic elements (11) fixed to the support (3).

Optionally, each elastic element (11) comprises a spring element with double radius and straight middle.

Optionally, the sliding wheels (2) are positioned inclined relative to a movement axis of the tool, with a motor generating rotational movement between the wheel assemblies, in which the inclined wheels are suitable for causing bi-helicoidal movement of the tool inside the pipeline.

BRIEF DESCRIPTION OF THE FIGURES

The detailed description presented hereunder refers to the appended figures and their respective reference numbers.

FIG. 2 shows an isolated view of an expanding arm according to an optional configuration.

FIG. 3 shows an isolated view of a wheel according to an optional configuration.

FIG. 4 shows a schematic end-view of a different configuration of a device for centring and pulling a tool in a pipeline.

DETAILED DESCRIPTION OF THE INVENTION

Figure 1:
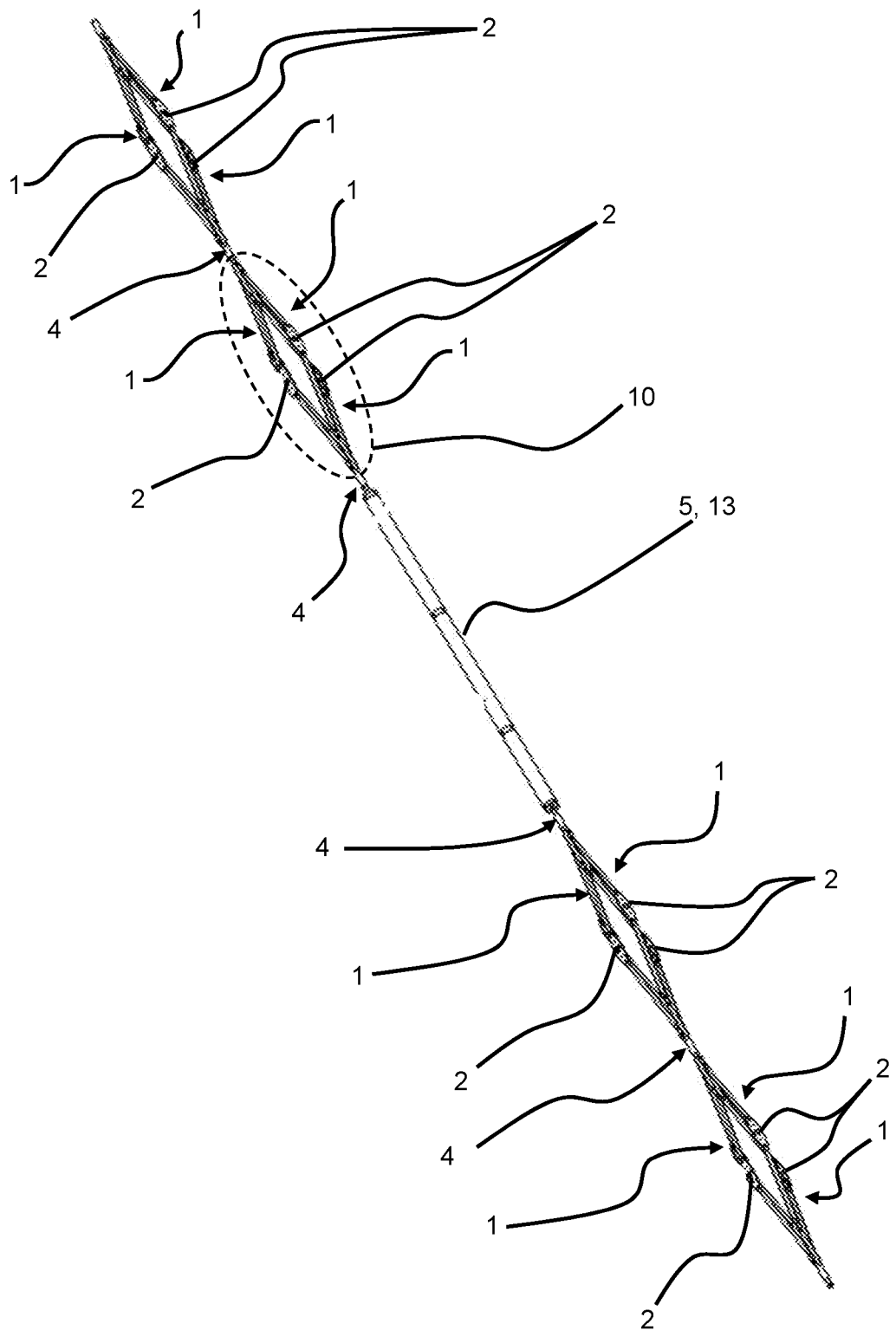
FIG. 1 shows an optional configuration of the device for centring and pulling a tool in a pipeline.

Firstly, it is emphasized that the following description is based on a preferred embodiment of the invention. As will be apparent to a person skilled in the art, however, the invention is not limited to this particular embodiment.

FIG. 1 shows an optional configuration of the device for centring and pulling a tool 5, or other tools connected to its ends, in a pipeline.

The device comprises expanding arms 1. As explained in more detail below, the arms 1 are "expanding" in the sense that, when the device is in use in a pipeline, the arms 1 are biased outwards. However, the arms 1 may be pushed inwards. In other words, the arms 1 can adjust (i.e. expand or compress) the overall diameter of the device according to the size of the pipeline around the device. This can be achieved by having a spring-like arm 1 and/or providing a suitable mechanism at the end of the arm 1.

Each expanding arm 1 comprises at least one sliding wheel 2. As such, the adjustability of the arms ensures the wheels 2 are in contact with the pipeline. Sliding wheels 2 are suitable for making contact with the inside wall of the pipeline. In addition, each sliding wheel 2 comprises at least one magnetic element 12 (an example of which is shown in FIG. 3). The provision of the at least one magnetic element 12 is for removing the oil film at the contact between the wheel and the inside wall of the pipeline. Optionally, the sliding wheel 2 itself is made of a magnetic material. That is, the wheel 2 can form the magnetic element 12.

Sliding wheels 2 are "sliding" in the sense that they provide the contact point between the device and the pipeline, and thus enable the relative movement or "sliding" of the device within the pipeline. However, as discussed above, and below in more detail, it is desirable for the wheels 2 to be in good contact with the surrounding pipeline and thus not to "skid" or "slip".

The wheels 2 may be driven by one or more motors 13, which may be positioned with the tool 5 example (this is indicated schematically in FIG. 1). In that scenario, power may be transmitted to the wheels 2 with drive shafts (such a flexible speedometer wire) and suitable gearing, which is not shown in the drawings for clarity. Alternatively, motors 13 may be provided at the location of the wheels 2. One motor may be used to power all the wheels 2.

Optionally, the device comprises at least one set 10 of expanding arms 1. In some configurations, each set 10 comprises four expanding arms 1. In other configurations, each set 10 comprises three expanding arms 1 as shown in FIG. 1. Other configurations are also possible. However, the configurations with three or four expanding arms 1 may be advantageous as it makes better centring possible, in comparison with other configurations.

Also optionally, four sets 10 each with three or four expanding arms 1 can be employed, with two sets 10 being positioned ahead of the tool 5 and two sets 10 being positioned after the tool 5. This is shown in FIG. 1.

In any one of the configurations described, each expanding arm 1 comprises at least one sliding wheel 2. Sliding wheel 2 is suitable for making contact with the inside wall of a pipeline. Accordingly, when a configuration with four expanding arms 1 is adopted, at least four sliding wheels 2 will be employed, i.e. at least one for each expanding arm 1.

A person skilled in the art will understand that the tool 5 used, as well as any tool connected to its ends, may be any tool 5 that is to be inserted and moved inside a pipeline. By way of example, this includes autonomous or remote-controlled devices for movement, wireline tools, cable tools and coiled tubing tools.

In alternative configurations, just one set 10 of expanding arms 1 may be adopted, wherein the tool 5 is enveloped by the expanding arms 1. In this configuration, preferably four expanding arms 1 are employed. Such a configuration is shown schematically in FIG. 4, in an end view that depicts the tool 5 enveloped by four arms 1. The arms can be coupled together with a linkage 4 at the end of the tool 5.

The use of the magnetic elements 12 on the wheels 2 removes the oil film between the wheel 2 and the inside wall of the pipeline, permitting non-sliding relative contact between them. That is, the magnetic elements 12 attract the metal of the pipeline and therefore urge the wheels 2 into contact with the pipeline. This eliminates the oil film that would otherwise be present between the wheel 2 and the inside wall of the pipeline. As a result a better contact between the wheels 2 and the pipeline is achieved.

FIG. 2 shows an isolated view of an expanding arm 1 according to an optional configuration. In this configuration, the expanding arm 1 is an elastic element of the spring type. More particularly, the expanding arm 1 can comprise two elastic elements 11 joined at a central point. Here "central" may mean substantially the exact middle of the arm 1, but it may also mean any point between the two ends of the arm. The sliding wheel 2 can be positioned at that central point, as shown. In this configuration, a support 3 for the sliding wheel 2 may also be adopted. The two elastic elements 11 of the expanding arms 1 can be fixed to the support 3.

In this optional configuration, it can be seen that each elastic element 11 comprises a spring element (of the spring assembly type) with a kink and straight middle. It is thus possible to achieve a configuration with reduced profile to cover a wider range of diameters. That is, the kinks and spring element 11 provide flexibility allowing the arm 1 to expand an compress when constrained by pipelines of different diameters, or as the diameter of an individual pipeline varies. However, in other configurations straight arms may be used to press the wheels against the wall over a wide range of diameters.

Optionally, the sliding wheels 2 are positioned so that they are inclined relative to the axis of movement of the tool 5 (or, in use, the central axis of the pipeline), so as to cause a helicoidal or bi-helicoidal movement inside the pipeline.

In optional configurations, as illustrated in FIG. 1, in which four sets 10 are adopted, e.g. with each set 10 having three or four expanding arms 1, two sets 10 can be positioned ahead of the tool 5 and two sets 10 can be positioned after the tool 5, all the sliding wheels 2 may be inclined, providing two sets 10 of inclined wheels, both in the front portion and in the rear portion. In this case the tool 5 follows a bi-helicoidal path as it moves through the pipeline, meaning that its traction capacity is twice as great as that of a conventional tool 5 that performs a helicoidal movement.

In this optional configuration, the sets 10 with three or four expanding arms 1 are joined at the ends of the expanding arms 1 by connecting elements. These elements may be any known connecting elements.

In addition, it is possible to employ a mechanical coupling accessory or linkage 4 connecting the sets 10 of expanding arms 1 to one another or to the tool 5. This mechanical coupling accessory 4 may be rigid, or flexible so as to allow rotational and bending movements.

As mentioned above the wheels 2 comprise at least one magnetic element 12. The magnetic element 12 is suitable for removing the oil film that would otherwise be present between the wheel 2 and the pipeline. This can be achieved by attracting the wheel 2 to the pipeline, thus expelling any oil that would otherwise be between the wheel 2 and the pipeline.

In some arrangements, a wheel 2 can comprise a magnetic element 12 by the magnetic element 12 forming the wheel 2. That is, the body of the wheel 2 can, in its entirety, be a magnetic element. In other arrangements, a wheel 2 can comprise one or more magnetic elements 12 embedded within, or otherwise attached to, or forming part of, the wheel 2. An example of this is shown in FIG. 3, which presents an isolated view of one possible implementation of a wheel 2. The wheel 2 has magnetic elements 12 embedded in the surface of the wheel 2 that, in use, contacts the surrounding pipeline. As such, the magnetic elements 12 are positioned as close to the pipeline as possible, and thus attract the pipeline as strongly as possible. In other configurations, the magnetic elements 12 may be positioned under the surface of the wheel 2. This may help avoid the magnetic elements becoming dislodged from the wheel 2 during use and being left stuck to the pipeline, rather than the wheel, for example.

It is emphasized that the capacity for traction and movement is increased by using magnetic elements on, in or as the main body of the sliding wheels 2, removing the oil film at the contact with the inside wall of the pipeline. In this way, the sliding wheels 2 do not "skid" providing the helicoidal or bi-helicoidal movement due to the inclined sliding wheels 2.

Modifications of the above-described apparatuses and methods, combinations between different variations as practicable, and variations of aspects of the invention that are obvious to those of skill in the art are intended to be within the spirit and scope of the claims.

The invention claimed is:

1. A device for centering and pulling a tool in a pipeline, the device comprising:
   a first expanding arm comprising a first elastic element and a second elastic element;
   a second expanding arm comprising a third elastic element and a fourth elastic element, wherein a distal end of each of the first elastic element and the third elastic element is coupled together to a first linkage at a first end of the tool, wherein a distal end of each of the second elastic element and the fourth elastic element is coupled together to a second linkage at a second end of the tool opposite the first end;
   a first wheel coupled to a proximal end of each of the first elastic element and the second elastic element; and
   a second wheel coupled to a proximal end of each of the third elastic element and the fourth elastic element, wherein each of the first wheel and the second wheel is suitable for making contact with an inside wall of a pipeline, wherein each of the first wheel and the second wheel comprises at least two magnetic elements embedded on an outer surface of each wheel, wherein each magnetic element is configured to remove an oil film coating the inside wall of the pipeline upon contact of a corresponding wheel with the inside wall of the pipeline.

2. The device of claim 1, wherein the first wheel is located at a first apex of a first convex curve formed by the first elastic element and the second elastic element relative to a movement axis of the tool, and wherein the second wheel is located at a second apex of a second convex curve formed by the third elastic element and the fourth elastic element relative to the movement axis of the tool.

3. The device of claim 2, further comprising:
   a first support coupled to the proximal end of each of the first elastic element and the second elastic element, wherein the first wheel is coupled to the proximal end of each of the first elastic element and the second elastic element via the first support; and
   a second support coupled to the proximal end of each of the third elastic element and the fourth elastic element, wherein the second wheel is coupled to the proximal end of each of the third elastic element and the fourth elastic element via the second support.

4. A device for centering and pulling a tool in a pipeline, comprising:
   a plurality of wheels, wheels configured to contact an inside wall of the pipeline;
   a plurality of expanding arms, wherein each expanding arm of the plurality of expanding arms is coupled to a respective wheel of the plurality of wheels via a first elastic element and a second elastic element, wherein the respective wheel is located at an apex of a convex curve formed by the first elastic element and the second elastic element relative to a movement axis of the tool; and
   a plurality of magnetic elements coupled to each wheel of the plurality of wheels such that each wheel comprises at least two magnetic elements of the plurality of magnetic elements, each magnetic element being configured to: (i) cause a corresponding wheel of the plurality of wheels to maintain contact between the corresponding wheel and the inside wall of the pipeline, and (ii) expel an oil film at a contact point between the corresponding wheel and the inside wall of the pipeline.

5. The device of claim 4, wherein the respective wheel is coupled to a proximal end of the first elastic element and a proximal end of the second elastic element, wherein a distal end of the first elastic element is coupled to a first linkage at a first end of the tool, and wherein a distal end of the second elastic element is coupled to a second linkage at a second end of the tool opposite the first end.

6. The device of claim 4, wherein the at least one set plurality of expanding arms comprises eight expanding arms, wherein each expanding arm of the eight expanding arms comprises a respective first elastic element and a respective second elastic element.

7. The device of claim 6, wherein a first four expanding arms of the eight expanding arms are positioned ahead of the tool, and wherein a second four expanding arms of the eight expanding arms are positioned behind the tool.

8. The device of claim 4, wherein each of the first elastic element and the second elastic element is of a spring type.

9. The device of claim 4, wherein a proximal end of the first elastic element is coupled to a proximal end of the second elastic element at a central point of each expanding arm.

10. The device of claim 9, wherein each wheel of the plurality of wheels is positioned at the central point.

11. The device of claim 9, wherein each expanding arm of the plurality of expanding arms further comprises a support for each wheel of the plurality of wheels.

12. The device of claim 11, wherein the proximal end of the first elastic element is coupled to a first end of the support, and wherein the proximal end of the second elastic element is coupled to a second end of the support.

13. The device of claim 4, wherein each of the first elastic element and the second elastic element comprises a spring element with a double kink and straight middle.

14. The device of claim 4, wherein the plurality of wheels is configured to cause bi-helicoidal movement of the tool inside the pipeline.

15. The device according to claim 4, further comprising:
a motor coupled to each wheel of the plurality of wheels, wherein the motor is configured to generate rotational movement of a respective wheel.

* * * * *